May 27, 1930. W. G. BUNKER 1,760,742
GRADER FOR VEGETABLES, FRUITS, AND THE LIKE
Filed Aug. 13, 1927
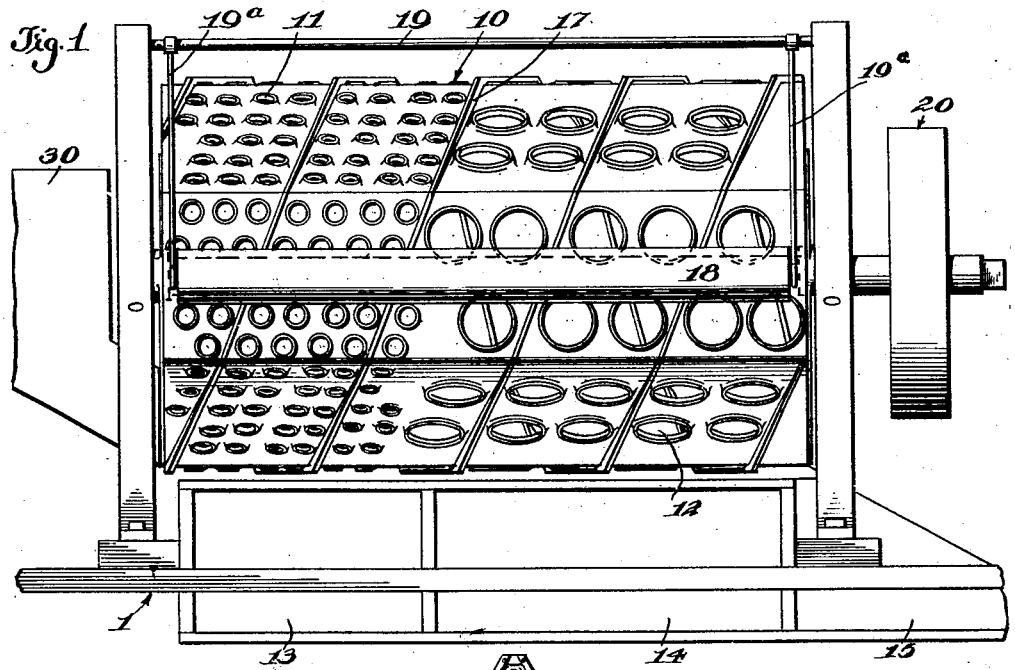
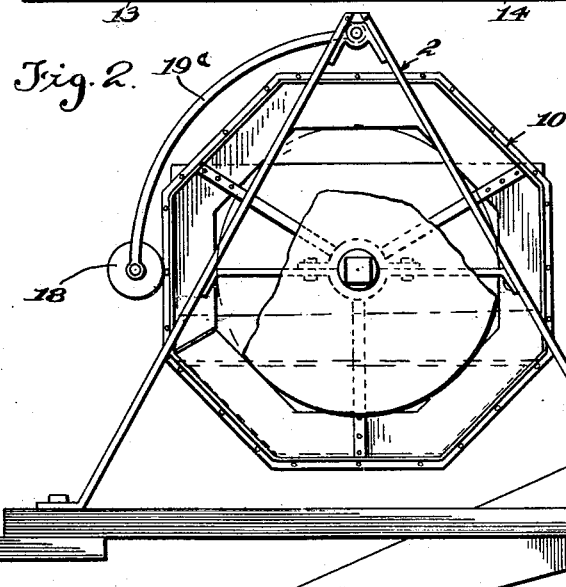
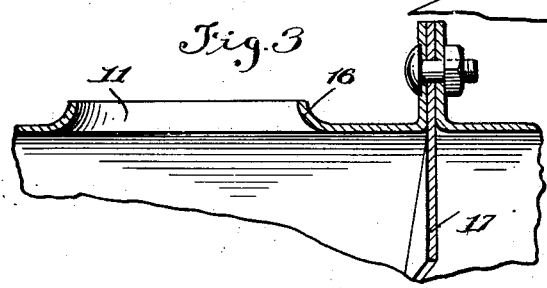
INVENTOR
W. G. Bunker
BY
ATTORNEY Patented May 27, 1930

1,760,742

UNITED STATES PATENT OFFICE

WILLIAM G. BUNKER, OF AUGUSTA, MAINE

GRADER FOR VEGETABLES, FRUITS, AND THE LIKE

Application filed August 13, 1927. Serial No. 212,665.

This invention relates to graders or sorters for vegetables, fruits and the like.

A primary object of the invention is to provide a simply constructed apparatus of this character in which the articles to be graded are fed to one end of the apparatus and during their passage therethrough are discharged at different points according to the sizes of the articles.

Another object is to provide a rotatable sorter of this character constructed so that the articles being sorted will pass out without danger of being bruised or cut.

Another object is to provide means whereby an article lodged in one of the openings will be pressed back to prevent its dropping down from the top of the apparatus which would bruise and injure the article.

In carrying out this object the invention is susceptible of modification without departing from the spirit or sacrificing any of the advantages of the claimed invention; there being shown in the drawings for illustrative purposes the preferred and practical form, in which:

Figure 1 represents a side elevation of an apparatus constructed in accordance with this invention.

Figure 2 is an end view thereof with parts broken out, and

Figure 3 is an enlarged detail sectional view showing the construction of the discharge openings and the mounting of the spirals.

Like references designate corresponding parts throughout the several figures of the drawings.

In the embodiment illustrated a suitable supporting base is shown at 1 from which rises a cylinder supporting frame 2 which may be of any suitable or desired construction to support a rotatable cylinder 10 which may be of any desired cross-sectional contour and which is open at both ends. As shown this cylinder is octagonal in cross section and the ends thereof are journaled in the frame 2 and it may be rotated by any suitable means a driving pulley being here shown connected for that purpose.

A hopper 30 is arranged at the other end and is designed to receive the fruit or vegetables to be sorted which pass from said hopper into the cylinder 10. The side walls of this cylinder are formed of connected spirally arranged strips provided with a plurality of discharge openings of various sizes those shown at the feed end being numbered 11 and of much smaller size than those 12 located at the other half of the cylinder. Whereas two sizes of openings are here shown obviously more may be used if desired.

Arranged below the smaller openings 11 is a receptacle 13 into which the articles such as potatoes, apples or the like drop through said openings into said receptacle and are conveyed to barrels or other suitable places of deposit. Another receptacle 14 is arranged below the larger openings 12 and is designed to receive the larger articles which are discharged through these openings. The largest vegetables or fruits pass out through the open end of the cylinder opposite the feed or receiving end and drop into a sluice which conveys them to a suitable place of deposit.

Openings 11 and 12 of the cylinder body are formed by striking out the material to provide apertures or mouths 16 as shown in Fig. 3 having rounded edges so that the articles discharged therethrough will not be exposed to any sharp edges and are thereby prevented from being bruised or cut.

A plurality of edgewise disposed spirals 17 are arranged around the inner face of the cylinder 10 and are secured to the cylinder in any suitable or desired manner. These spirals during the rotation of the cylinder operate to carry the vegetables or fruit along over the holes or openings in the cylinder.

It will be obvious that during the rotation of the cylinder the fruit or potatoes will remain in the bottom of the cylinder by gravity and the spirals will operate to carry them over the holes and they will drop out through the holes according to the sizes thereof the smaller first, medium next and the larger or last pass out through the open end of the cylinder.

A gravity roller 18 is suspended from a rod 19 extending longitudinally above the cylinder 10. This roller 18 is mounted on curved arms 19ª and it extends down well over the sides of the cylinder and lies against the outer face thereof being designed to engage any potatoes, vegetables or other fruit which may have become jammed in the openings and the weight of the roller will force the fruit back into the cylinder before it can be carried to the top thereof and dropped down thereby avoiding bruising of the fruit or vegetables.

While this apparatus is primarily intended for grading or sorting potatoes obviously it may be used for other vegetables and fruit, all that is necessary in the operation thereof being to dump the vegetables into the hopper 30 from which they will pass into the cylinder 10 and when the cylinder is rotated or if it is continuously rotated the vegetables will pass from the upper to the lower end of the cylinder and the smaller ones pass out through the smaller holes 11, the medium size through the holes 12 and the largest out through the open end. As above described these vegetables so sorted drop into their respective sluices and are conveyed to barrels or other suitable places of deposit.

Without further description it is thought that the features and advantages of the invention will be readily apparent to those skilled in the art, and it will of course be understood that changes in the form, proportion and minor details of construction may be resorted to without departing from the spirit and scope of the claimed invention.

I claim:—

A grader or sorter for vegetables, fruits, and the like, comprising a revoluble container having side walls formed of connected spirally arranged strips, edge-wise disposed spirals secured between said strips, said walls being provided with a plurality of discharge openings of different sizes to permit the selective discharge of the articles being graded.

WILLIAM G. BUNKER.